United States Patent
Phatak et al.

(10) Patent No.: US 10,713,933 B1
(45) Date of Patent: Jul. 14, 2020

(54) DETECTION OF FAILING EMISSIONS SENSORS

(71) Applicant: Caterpillar Inc., Deerfield, IL (US)

(72) Inventors: Deepashri Vinayak Phatak, Peoria, IL (US); Dereck Glenn Heffron, Peoria, IL (US); Jun Cai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/436,258

(22) Filed: Jun. 10, 2019

(51) Int. Cl.
| | |
|---|---|
| *G08B 23/00* | (2006.01) |
| *G08B 29/04* | (2006.01) |
| *G08B 21/12* | (2006.01) |
| *G08B 5/22* | (2006.01) |
| *G08B 25/01* | (2006.01) |
| *G08B 21/18* | (2006.01) |

(52) U.S. Cl.
CPC ............. *G08B 29/04* (2013.01); *G08B 5/222* (2013.01); *G08B 21/12* (2013.01); *G08B 21/182* (2013.01); *G08B 25/016* (2013.01)

(58) Field of Classification Search
CPC ....... G08B 29/04; F02D 41/222; F02D 41/22; G06N 99/005; G01N 33/0006; F01N 11/00; F01N 2570/14
See application file for complete search history.

(56) References Cited

U.S. PATENT DOCUMENTS

| | | |
|---|---|---|
| 5,819,195 A | 10/1998 | Iwata |
| 6,920,751 B2 | 7/2005 | Yasui et al. |
| 7,930,932 B2 | 4/2011 | Kariya et al. |
| 8,694,197 B2 | 4/2014 | Rajagopalan et al. |
| 9,606,092 B2 | 3/2017 | Brahma |
| 2014/0360166 A1* | 12/2014 | Chandrasekaran ..... F01N 11/00 60/274 |
| 2017/0328294 A1* | 11/2017 | Poloni ................... F01N 11/007 |
| 2018/0291832 A1 | 10/2018 | Whitney et al. |

* cited by examiner

*Primary Examiner* — Toan N Pham
(74) *Attorney, Agent, or Firm* — Lee & Hayes, PLLC (57) ABSTRACT

An emissions sensor health monitor can acquire nitrogen oxide (NOx)-in values measured by an input emissions sensor of the machine and NOx-out values measured by an output emissions sensor of the machine. The emissions sensor health monitor can identify samples of the machine channel data that meet criteria associated with an idle operating condition of an engine of the machine, and determine NOx delta values for the samples. The emissions sensor health monitor can determine that the NOx delta values are above a preset acceptable threshold for at least a threshold time period, and in response perform one or more responsive actions.

20 Claims, 7 Drawing Sheets

Machine Channel Data 104

| | Engine Speed (RPMs) 302 | Fuel Level (mm³) 304 | Emissions Temperature (°C) 306 | NOx-In Value (ppm) 308 | NOx-Out Value (ppm) 310 | NOx Delta Value (ppm) 312 |
|---|---|---|---|---|---|---|
| Day 1 | 700.1665 | 93.8484 | 171.6972 | 399.0687 | 405.5508 | -6.4822 |
| Day 2 | 700.5724 | 86.6365 | 154.3419 | 385.6242 | 390.1230 | -4.4988 |
| Day 3 | 700.5352 | 82.7308 | 155.8833 | 343.5462 | 316.4277 | 27.1185 |
| Day 4 | 700.2737 | 96.2148 | 175.1442 | 438.6468 | 401.8834 | 36.7634 |
| ... | ... | ... | ... | ... | ... | ... |
| Day 210 | 700.3160 | 91.1719 | 179.7146 | 301.4690 | 381.7945 | -80.3255 |
| Day 211 | 701.0213 | 81.4542 | 178.6465 | 327.4668 | 413.3813 | -85.9145 |
| Day 212 | 700.0846 | 125.5888 | 156.8205 | 263.7459 | 315.3579 | -51.6120 |
| Day 213 | 700.1621 | 110.5035 | 176.1166 | 255.6402 | 288.5124 | -32.8722 |
| ... | ... | ... | ... | ... | ... | ... |
| Day N | 700.1568 | 83.4138 | 174.4226 | 307.8195 | 370.2660 | -62.4464 |

DETECTION OF FAILING EMISSIONS SENSORS

TECHNICAL FIELD

The present disclosure relates to a system and method for detecting failing emissions sensors, and more particularly, to detecting failing emissions sensors at least in part by comparing data from two emissions sensors associated with idle operating conditions of an engine.

BACKGROUND

Vehicles and other machines with internal combustion engines, including diesel engines, gasoline engines, gaseous fuel-powered engines, and other engines, can produce a complex mixture of pollutants. These pollutants may include nitrogen oxides (NOx) and other compounds. Many machines are equipped with aftertreatment systems designed to reduce the amount of NOx and other pollutants that the machines release into the atmosphere. For example, some aftertreatment systems use selective catalytic reduction (SCR) to inject a gaseous or liquid reductant, such as urea, into an exhaust path to be absorbed into a substrate. Such a reductant may, in some examples, be known as Diesel Exhaust Fluid (DEF) in North America or as "Add-Blue" in Europe. The injected reductant can react with NOx in the exhaust path to form water and nitrogen. Conversion of NOx to water and nitrogen can accordingly reduce NOx levels actually emitted by the machine into the atmosphere.

Aftertreatment systems can include NOx sensors positioned in the exhaust path. The NOx sensors may, for example, be used to determine how much reductant to introduce into the exhaust path based on detected NOx levels. However, over time, measurements from a NOx sensor can drift away from actual NOx concentrations in emissions. Such measurement drift can indicate that a NOx sensor is failing, or has become faulty, even if conventional sensor diagnostics would not detect the issue. Inaccurate measurements from failing or faulty NOx sensors can lead to problems with a machine or its emissions. For example, inaccurate NOx measurements can cause an aftertreatment system to inject too much, or not enough, reductant into the exhaust path. Significant machine downtime and lost productivity can occur if failing NOx sensors are not detected and fixed. Accordingly, some methods have been developed to determine when emissions sensors have failed or are about to fail.

For example, U.S. Pat. No. 8,694,197 to Rajagopalan, (hereinafter "Rajagopalan") describes a method of diagnosing vehicle NOx sensor faults. In particular, Rajagopalan can compare output received by a NOx sensor against fuel consumption over time, and determines a NOx sensor gain using a least-squares estimation for calculated means based on expected NOx sensor output. Rajagopalan can then determine if the NOx sensor gain is too high or too low relative to an expected output for the NOx sensor. However, the method described by Rajagopalan uses linear analysis to detect NOx sensor faults based on data associated with a single NOx sensor. The method of Rajagopalan also only begins when certain initial conditions are met, for instance when a rate of fuel flow to the engine is above a threshold to "help ensure that sufficient levels of NOx are present in the exhaust gas so as to result in an accurate diagnosis of NOx sensor faults." Because Rajagopalan encourages analyzing NOx sensors only when relatively high NOx levels are present, Rajagopalan may be unable to detect failing NOx sensors when lower NOx levels are being produced, such as when the engine is idle and is consuming lower amounts of fuel.

The example systems and methods described herein are directed toward overcoming the one or more of the deficiencies described above.

SUMMARY

According to a first aspect, a method can include acquiring, by an emissions sensor health monitor executing on a computing device, machine channel data from a machine that indicates NOx-in values measured by an input emissions sensor of the machine and NOx-out values measured by an output emissions sensor of the machine. The method can include identifying, by the emissions sensor health monitor, samples of the machine channel data that meet criteria associated with an idle operating condition of an engine of the machine, and determining, by the emissions sensor health monitor, NOx delta values for the samples. The method can also include determining, by the emissions sensor health monitor, that the NOx delta values are above a preset acceptable threshold for at least a threshold time period, and performing, by the emissions sensor health monitor, one or more responsive actions based on determining that that the NOx delta values are above the preset acceptable threshold for at least the threshold time period.

According to a further aspect, a computing device can include one or more processors and memory storing computer-executable instructions. The computer-executable instructions, when executed by the one or more processors, can cause the one or more processors to acquire machine channel data from a machine that indicates NOx-in values measured by an input emissions sensor of the machine and NOx-out values measured by an output emissions sensor of the machine. The computer-executable instructions can also cause the one or more processors to identify samples of the machine channel data that meet criteria associated with an idle operating condition of an engine of the machine, and determine NOx delta values for the samples. The computer-executable instructions can further cause the one or more processors to determine that the NOx delta values are above a preset acceptable threshold for at least a threshold time period, and perform one or more responsive actions based on the determining that the NOx delta values are above the preset acceptable threshold for at least the threshold time period.

According to another aspect, one or more non-transitory computer-readable media can store computer-executable instructions that, when executed by one or more processors of a computing device, cause the computing device to perform operations. The operations can include acquiring machine channel data from a machine that indicates NOx-in values measured by an input emissions sensor of the machine and NOx-out values measured by an output emissions sensor of the machine. The operations can also include identifying samples of the machine channel data that meet criteria associated with an idle operating condition of an engine of the machine, and determining NOx delta values for the samples. The operations can further include determining that the NOx delta values are above a preset acceptable threshold for at least a threshold time period, and performing one or more responsive actions based on the determining that that the NOx delta values are above the preset acceptable threshold for at least the threshold time period.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
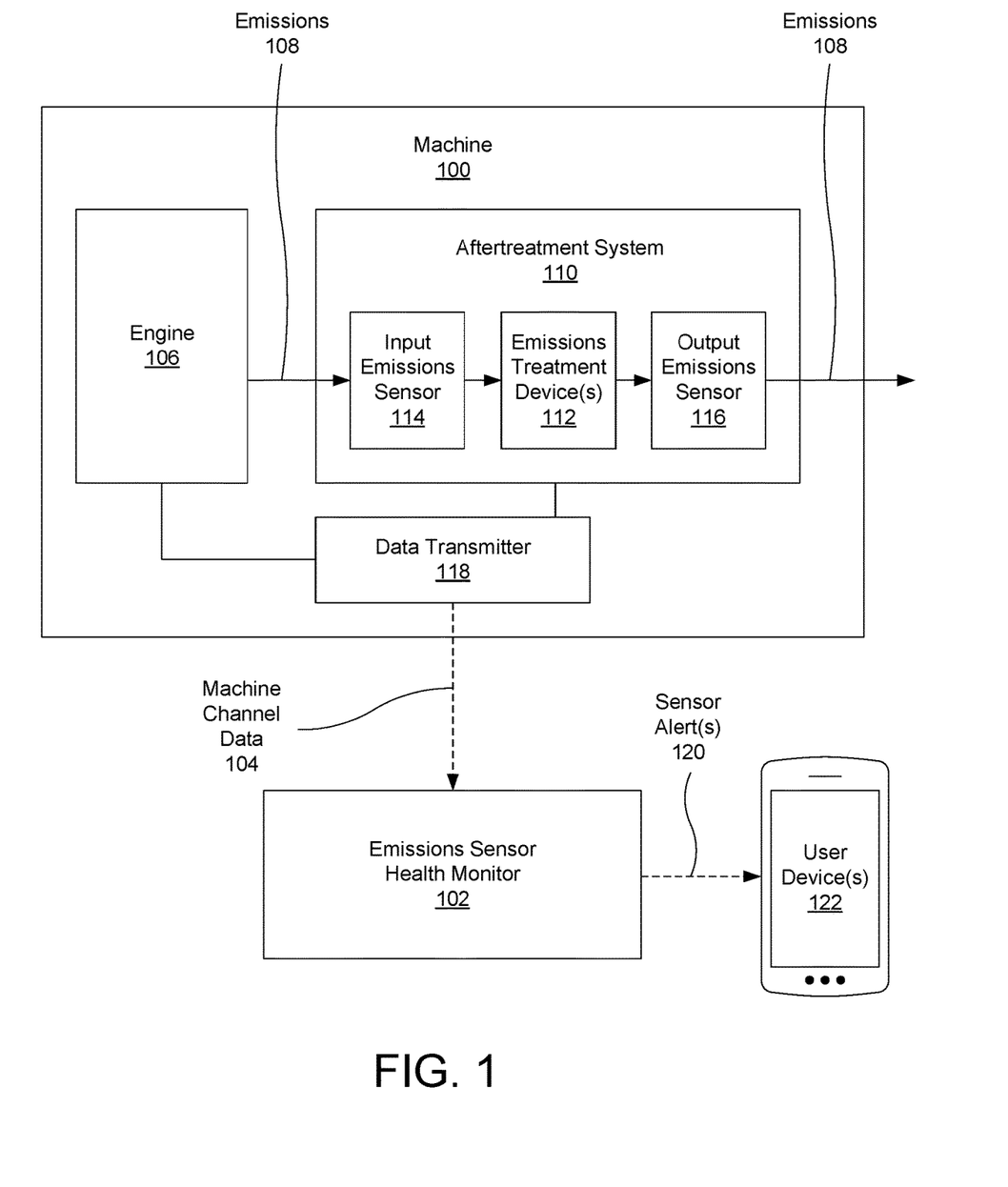
FIG. 1 depicts an example of a system including a machine and an emissions sensor health monitor.

FIG. 1 depicts an example of a system including a machine 100 and an emissions sensor health monitor 102 configured to identify a failing emissions sensor of the machine 100 based on machine channel data 104 provided by the machine 100.

The machine 100 can have an engine 106 that produces emissions 108. The engine 106 can be a combustion engine, such as a diesel engine, a gasoline engine, a gaseous fuel-powered engine, or any other type of combustion engine that produces emissions 108. The machine 100 can be a stationary or mobile machine that performs one or more types of operations associated with one or more industries, such as mining, construction, paving, farming, or other industries, and may operate between or within worksites and other environments. In various examples, the machine 100 can be a truck, excavator, tractor, forklift, backhoe, crane, earth moving vehicle, mining vehicle, material handling equipment, farming equipment, marine vessel, aircraft, generator, or any other type of machine with an engine 106 that produces emissions 108. In some examples, the machine 100 can be a type of machine that is subject to United States Environmental Protection Agency Tier 4 emissions standards, and/or is subject to other emissions standards.

The machine 100 can also have an aftertreatment system 110. The aftertreatment system 110 can be configured to receive emissions 108 produced by the engine 106 and process the emissions 108 with one or more emissions treatment devices 112 before the emissions 108 leave the machine 100 and enter the atmosphere, for instance by treating the emissions 108 to remove or reduce pollutants. Accordingly, the aftertreatment system 110 may help the machine 100 to comply with relevant emissions standards.

The emissions 108 produced by the engine 106 can include pollutants such as NOx. The term "NOx" can refer to nitric oxide (NO), nitrogen dioxide ($NO_2$), and/or other nitrogen oxides. The aftertreatment system 110 can include one or more emissions treatment devices 112 configured to reduce the amount of NOx in the emissions 108 before the emissions 108 are output by the machine 100 into the atmosphere. In some examples, an emissions treatment device 112 can be a selective catalytic reduction (SCR) device that injects a gaseous or liquid reductant, such as urea, into a catalyst positioned within an exhaust path that routes the emissions 108 through the aftertreatment system 110. The injected reductant can react with NOx in the emissions 108 to at least partially convert the NOx into water and nitrogen, thereby reducing the amount of NOx left in the emissions 108 when the emissions 108 leave the aftertreatment system 110. Additionally, or alternatively, emissions treatment devices 112 may include a diesel particulate filter (DPF), an oxidation catalyst, and/or other components configured to remove portions of, chemically react with, and/or otherwise act on the emissions 108 before the emissions 108 are released to the atmosphere.

The aftertreatment system 110 can include an input emissions sensor 114 that measures the levels of one or more pollutants in emissions 108 received from the engine 106 before treatment by the emissions treatment devices 112, as well as an output emissions sensor 116 that measures the levels of the same pollutants in the emissions 108 after the emissions 108 have been treated by the emissions treatment devices 112. For example, the input emissions sensor 114 can be a NOx sensor positioned at an exhaust manifold of the engine 106 and/or at an entry point in an exhaust path from the engine 106 to the aftertreatment system 110, such that the input emissions sensor 114 can measure the NOx levels in emissions 108 produced by the engine 106. As an example, a NOx sensor can comprise ceramic-type metal oxides, such yttria-stabilized zirconia (YSZ), and electrical signals measured from electrodes placed on the NOx sensor can indicate a concentration of NOx in the emissions 108. The output emissions sensor 116 can accordingly be a similar or identical NOx sensor located at a position in the exhaust path after the emissions treatment devices 112, such as at or before a tail pipe or other exhaust outlet of the machine 100. Accordingly, the output emissions sensor 116 can measure NOx levels in the emissions 108 that will be output into the atmosphere from the machine 100 following any treatments performed by the emissions treatment devices 112. As will be discussed further below, the machine 100 can report NOx levels in the emissions 108 measured by both the input emissions sensor 114 and the output emissions sensor 116 in machine channel data 104 sent to the emissions sensor health monitor 102.

The machine 100 can have a data transmitter 118 that can receive machine channel data 104 from the engine, the aftertreatment system 110, and/or other components of the machine 100, and wirelessly transmit the machine channel data 104 to the emissions sensor health monitor 102. The data transmitter 118 can be compatible with one or more types of data connections, such as Wi-Fi connections, cellular data connections, satellite data connections, and/or any other type of wireless data connection. In some examples, the data transmitter 118 can also be a data receiver such that the machine 100 can receive data from the emissions sensor health monitor 102, such as instructions on what types of machine channel data 104 to report and/or when to submit such reports to the emissions sensor health monitor 102. In alternate examples, machine channel data 104 can be provided from a machine 100 to the emissions sensor health monitor 102 through a wired connection, by downloading or transferring machine channel data 104 from the machine 100 to a memory card or other data storage device and then uploading or transferring stored machine channel data 104 to the emissions sensor health monitor 102, or via any other data transfer process.

The machine channel data 104 that the data transmitter 118 sends to the emissions sensor health monitor 102 can include input NOx levels in emissions 108 as measured by the input emissions sensor 114, and output NOx levels in the emissions 108 as measured by the output emissions sensor 116. The machine channel data 104 can also include other types of data about the engine 106, the aftertreatment system 110, and/or the emissions 108 provided by those elements or other types of sensors associated with those elements. For example, machine channel data 104 can also include engine speed data, engine load data, fuel data such as fuel levels and/or fuel consumption rates, temperature data about the temperature of emissions 108 in the exhaust path as produced by the engine 106 and/or during processing of the emissions 108 by the aftertreatment system 110, and/or any other data about the machine 100.

The emissions sensor health monitor 102 can be configured to analyze machine channel data 104 as described herein to determine whether the input emissions sensor 114 and/or output emissions sensor 116 is failing or has failed. In some examples, when the engine 106 is in an idle operating condition, the engine 106 can be operating at a relatively low speed, be using a relatively low amount of fuel, and be generating emissions 108 at a relatively low temperature, at least with respect to those values when the engine 106 is not idle and is under heavier load. For these reasons, the engine 106 may also generate relatively low levels of NOx in its emissions 108 in the idle operating condition, again relative to other operating states where the engine 106 is under heavier load and produces more NOx. Accordingly, when the input emissions sensor 114 and the output emissions sensor 116 are operating properly and the engine 106 is in the idle condition, NOx levels measured by the input emissions sensor 114 and the output emissions sensor 116 should be relatively similar, for example being between a threshold range of each other. However, if the input emissions sensor 114 and the output emissions sensor 116 measure NOx levels that have a difference beyond an acceptable threshold during idle engine conditions, the emissions sensor health monitor 102 can determine that at least one of the input emissions sensor 114 and the output emissions sensor 116 may be failing, as described further below.

When the emissions sensor health monitor 102 determines that an input emissions sensor 114 and/or output emissions sensor 116 may be failing, in some examples the emissions sensor health monitor 102 can transmit a sensor alert 120 to user devices 122 associated with one or more recipients. A user device 122 can be a mobile phone such as a smart phone or other cellular phone, a personal digital assistant (PDA), a personal computer (PC) such as a laptop, desktop, or workstation, a tablet computer, a smart watch, or any other type of computing or communication device. For example, a sensor alert 120 can be an email sent to one or more user devices 122 using email addresses of one or more designated recipients associated with the machine 100. As an example, a sensor alert 120 can be an email send to a user device 122 of a technician assigned to fix the machine 100, and the technician may respond to the sensor alert 120 by examining and/or replacing an input emissions sensor 114 or an output emissions sensor 116 that is trending toward failure before it fails completely. In other examples, a sensor alert 120 can be a text message or other notification sent to one or more user devices 122 associated with designated recipients, such as a text message sent to mobile phones associated with emissions sensor technicians associated with the machine 100. In still other examples, a sensor alert 120 can be a notification displayed in a user interface of the emissions sensor health monitor 102 and/or in an application executing on a user device 122.

Figure 2:
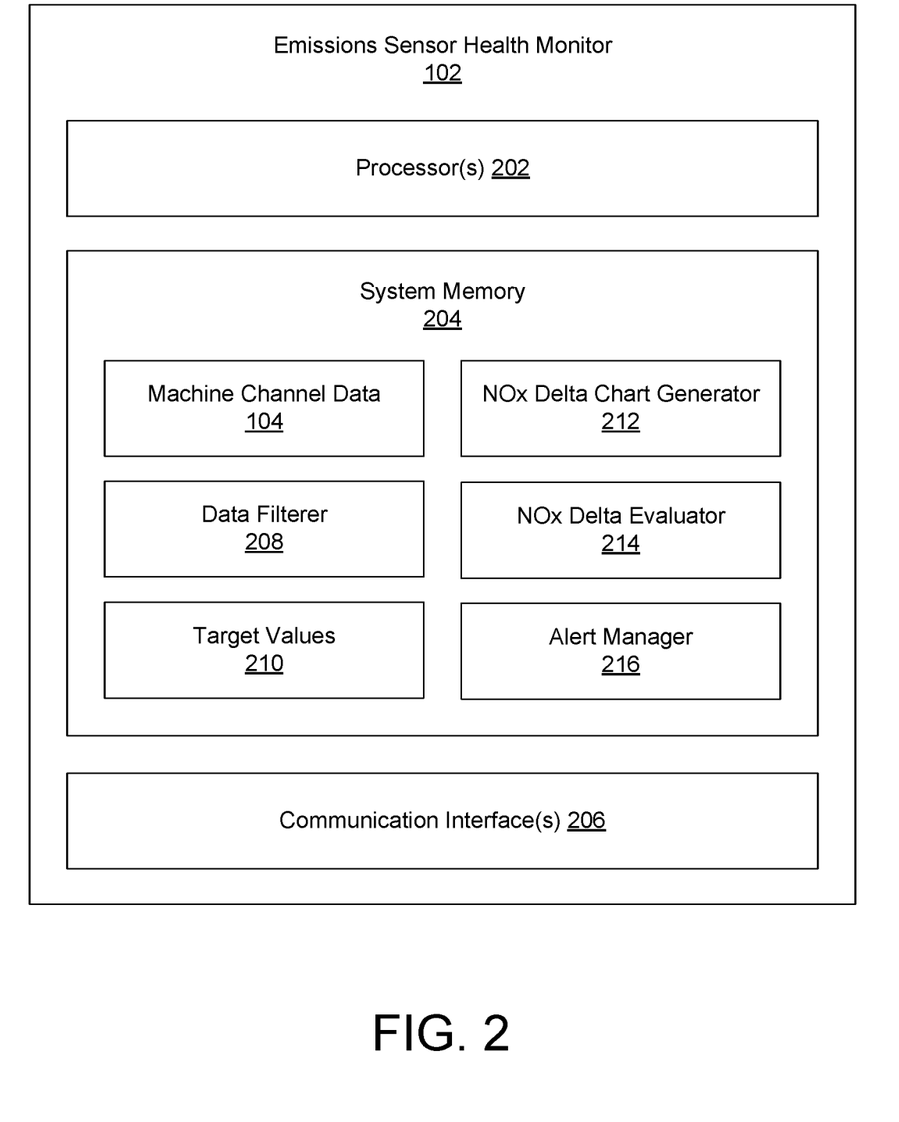
FIG. 2 depicts an example system architecture for an emissions sensor health monitor.

FIG. 2 depicts an example system architecture for an emissions sensor health monitor 102. The emissions sensor health monitor 102 can be, or execute on, a server, desktop computer, laptop computer, tablet computer, mobile phone, or any other computing device that includes one or more processors 202, system memory 204, and one or more communication interfaces 206.

The processor(s) 202 may operate to perform a variety of functions, as set forth herein. In some examples, the processor(s) 202 may include a central processing unit (CPU), a graphics processing unit (GPU), both CPU and GPU, or other processing units or components known in the art.

The system memory 204 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media may be non-transitory computer-readable media. The computer-readable media may be configured to store computer-executable instructions that can be executed by the processor(s) 202 to perform the operations described herein, as well as program modules, program data, and/or one or more operating systems. Additionally, the processor(s) 202 may possess local memory, which also may store program modules, program data, and/or one or more operating systems.

The communication interfaces 206 can be wireless and/or wired data communication interfaces, such as interfaces for Wi-Fi connections, cellular data connections, satellite data connections, Ethernet connections, and/or any other type of data connection. As described herein, the communication interfaces 206 can receive machine channel data 104 from one or more machines 100, transmit sensor alerts 120 to user devices 122 of designated recipients, and/or send or receive any other type of data.

The system memory 204 can store machine channel data 104 associated with one or more machines 100. For example, the system memory 204 can store raw store machine channel data 104 received from one or more machines 100, and/or processed machine channel data 104 that has been operated on by elements of the emissions sensor health monitor 102 as described herein. The system memory 204 can also store computer-readable instructions and/or or other data associated with a data filterer 208, target values 210, a NOx delta chart generator 212, a NOx delta evaluator 214, and/or an alert manager 216.

The data filterer 208 can operate on raw machine channel data 104 received from one or more machines 100 identify samples of the machine channel data 104 that meet predefined criteria, and/or reduce noise in the machine channel data 104. In some examples, the data filterer 208 may downsample raw machine channel data 104 received from a machine 100. For instance, if raw machine channel data 104 received from a machine 100 includes data captured multiple times per second, in some examples the data filterer 208 can downsample the received raw machine channel data 104 to 1 hertz (Hz), such that one sample per second from the reported raw machine channel data 104 is kept or identified for further analysis.

The data filterer 208 can also identify portions of the machine channel data 104, such as portions within downsampled machine channel data 104, that meet criteria associated with an idle operating condition of the engine 106. In some examples, the criteria can include threshold values for data in machine channel data 104 about engine speed, fuel rate, and/or emissions temperature that can indicate the engine 106 was in an idle operating condition when the values were captured. For instance, the criteria associated with an idle condition of an engine 106 can include an engine speed threshold for the idle condition, an emissions temperature threshold for the idle condition, and/or a fuel rate threshold for the idle condition. In one example, the engine speed threshold for the idle condition can be at or below 715 revolutions per minute (RPMs), the emissions temperature threshold for the idle condition can be at or below 300 degrees Celsius, and the fuel rate threshold for the idle condition can be at or below 200 cubic millimeters (mm$^3$). The data filterer 208 may be configured with different predefined threshold fuel rates for different types of engines 106 or different configurations of engines 106. Accordingly, in this example, the data filterer 208 can identify samples of the machine channel data 104 that are associated with an idle operating condition for the engine 106 when the samples have engine speeds below 715 RPMs, emissions temperatures below 300 degrees Celsius, and fuel rates below 200 mm$^3$. In other examples, the thresholds in the criteria for the idle condition can have higher or lower values, be expressed in other units, be expressed in acceptable ranges or acceptable standard deviations away from target values, and/or otherwise express criteria that identifies portions of machine channel data 104 recorded when the engine 106 was in the idle condition.

After the data filterer 208 has identified portions of the machine channel data 104 that meet the criteria for the idle condition, the data filterer 208 can smooth those identified portions to reduce noise. In some examples, the data filterer 208 can smooth identified portions of the machine channel data 104 by determining daily averages of the identified portions. As an example, when the data filterer 208 identifies discrete segments of downsampled machine channel data 104 throughout a particular day that meet the idle condition criteria, thus indicating that the engine 106 was in an idle condition during those portions of the day, the data filterer 208 can average the identified discrete segments to generate a daily average of the machine channel data 104 associated with the idle condition.

Figure 3:
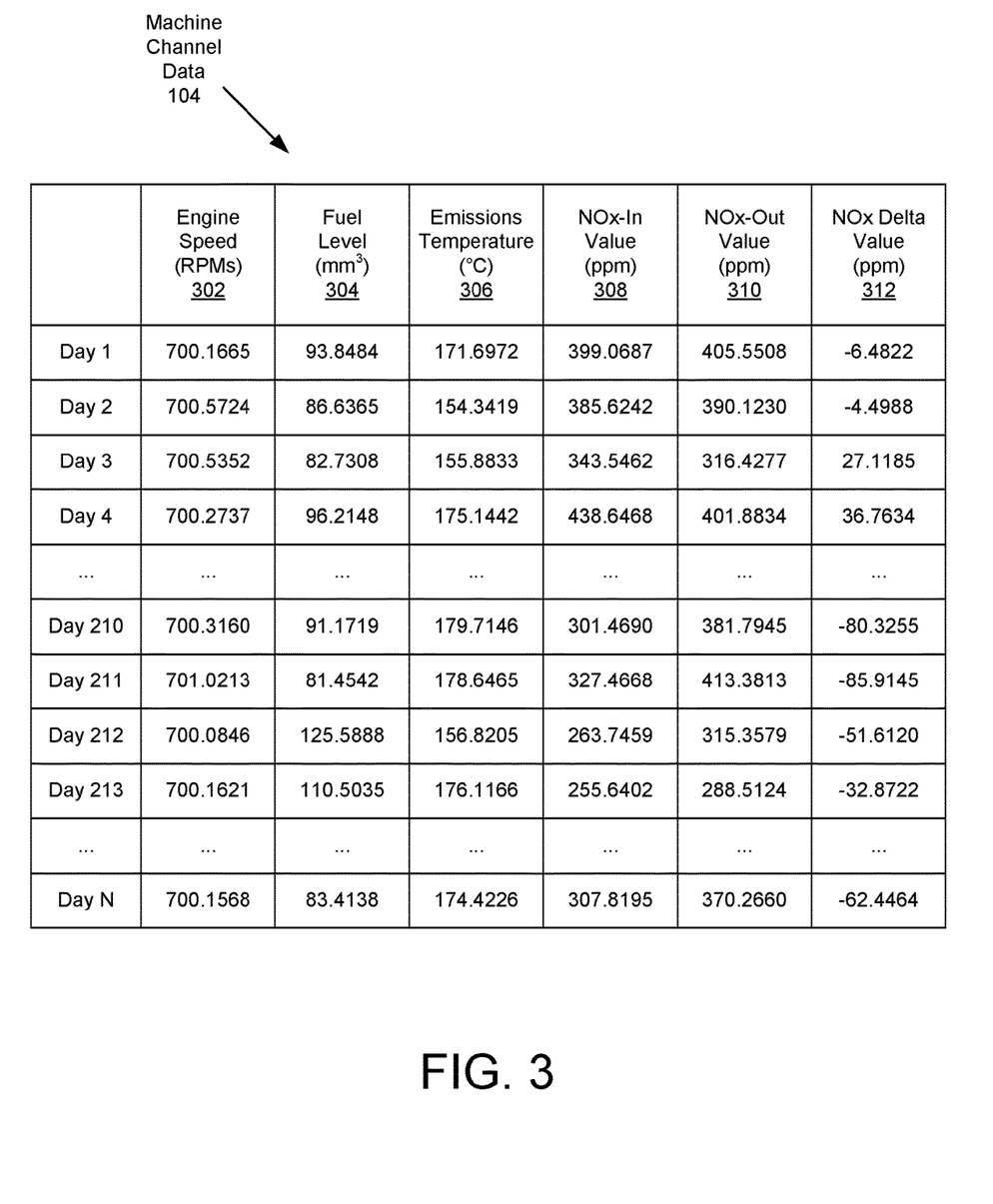
FIG. 3 depicts example daily averages of machine channel data that meets criteria for an idle condition of an engine of a machine.

As an example, FIG. 3 depicts example daily averages of machine channel data 104 that the data refiner 208 has generated from downsampled data that met criteria for an idle operating condition of an engine 106 of a machine 100. As shown in FIG. 3, the daily averages of samples measured when the engine 106 of the machine 100 was in the idle condition can include daily averages of engine speed 302, fuel levels 304, emissions temperatures 306, NOx-in values 308 measured by an input emissions sensor 114, NOx-out values 310 measured by an output emissions sensor 116, and NOx delta values 312. In some examples, the engine speed 302 can be expressed in RPMs, the fuel levels 304 in mm$^3$, the emissions temperatures 306 in degrees Celsius, and the NOx-in values 308 and NOx-out values 310 in parts per million (ppm). The NOx delta values 312 can be a difference found by subtracting the NOx-out values 310 from the NOx-in values 308.

Figure 4:
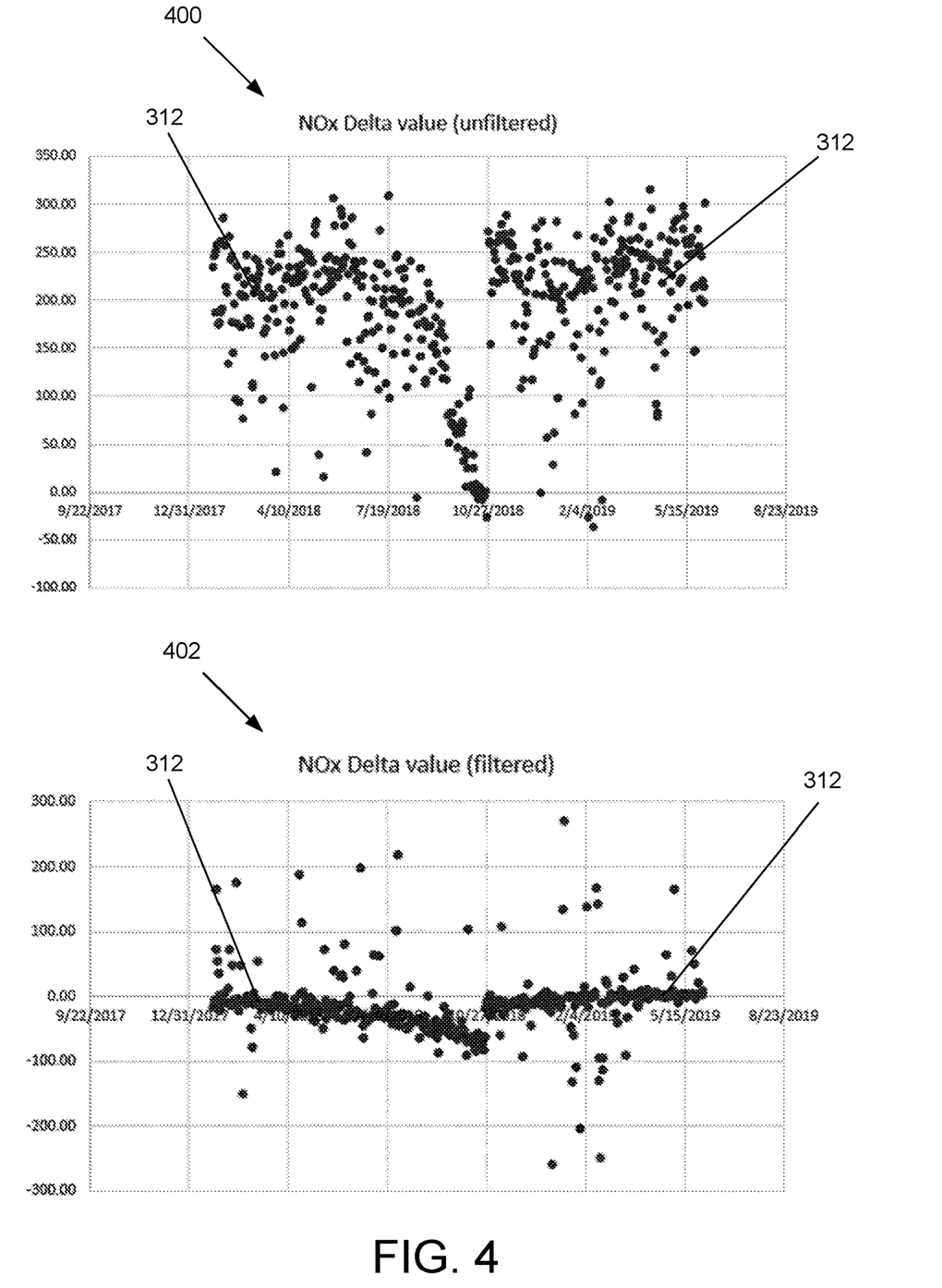
FIG. 4 depicts an example of an unfiltered chart of NOx delta values and a filtered chart of NO delta values.

As noted above, the NOx delta values 312 shown in FIG. 3 can be determined from samples of downsampled data that meet idle operating conditions for an engine 106. This can reduce noise and/or focus the data analysis on filtered data associated with the idle operating conditions. As an example, FIG. 4 depicts an unfiltered chart 400 illustrating example daily averages of NOx delta values 312 determined from samples that have not been filtered for idle operating conditions of an engine 106, as well as a filtered chart 402 illustrating example daily averages of NOx delta values 312 determined from samples that have been filtered for idle operating conditions of an engine 106. The analysis discussed herein can be based on samples of filtered data, similar to the example filtered chart 402 of FIG. 4.

As noted above, the input emissions sensor 114 and the output emissions sensor 116 should provide substantially similar NOx measurements when the engine 106 is in the idle operating condition. For example, when the input emissions sensor 114 and the output emissions sensor 116 are operating properly and the engine 106 is in the idle condition, the NOx-in values 308 measured by the input emissions sensor 114 and the NOx-out values 310 measured by the output emissions sensor 116 should be relatively similar, for example being between a threshold range of each other. In other words, a NOx delta value 312 expressing the difference between NOx-in values 308 measured by the input emissions sensor 114 and NOx-out values 310 measured by the output emissions sensor 116 should be lower when the engine 106 is in the idle condition than when the engine 106 is not in the idle condition, such that the engine 106 may be producing higher levels of NOx and the emissions treatment devices 112 should therefore be removing higher levels of NOx from emissions 108 between when the emissions 108 are measured by the input emissions sensor 114 and the output emissions sensor 116. However, when one or both of the input emissions sensor 114 and the output emissions sensor 116 are failing, the NOx delta value 312 between the NOx-in values 308 and NOx-out values 310 can be higher, or lower, than expected even when the engine 106 is in the idle condition.

The system memory 204 can accordingly store target values 210 representing expected or target differences between NOx-in values 308 measured by an input emissions sensor 114 and NOx-out values 310 measured by an output emissions sensor 116 during idle operating conditions for an engine 106. The target values 210 can be historical NOx delta values determined based on historical machine channel data 104 received in the past from other machines 100 of the same type or model. The target values 210 can be derived from time periods in which input emissions sensors 114 and output emissions sensors 116 of those other machines 100 were working properly, and/or be distinguished from time periods in which input emissions sensors 114 and output emissions sensors 116 of those other machines 100 were failing or were faulty. Accordingly, the target values 210 can represent, for idle operating conditions, upper and/or lower bounds for the NOx delta values 312 that indicate the input emissions sensor 114 and output emissions sensor 116 are operating properly and are not faulty, and/or are not failing. In some examples, the target values 210 can represent a target range for NOx delta values 312 of plus or minus 20 ppm, 25 ppm, 30 ppm, or any other range.

Figure 5:
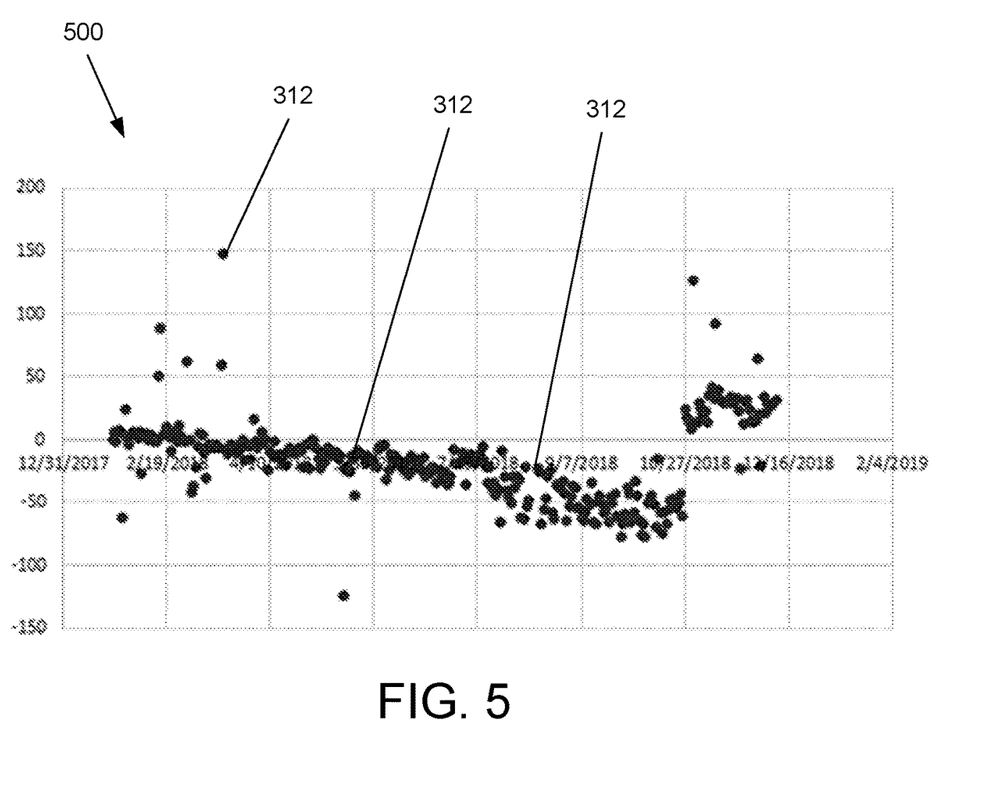
FIG. 5 depicts an example NOx delta chart illustrating daily averages of differences between idle condition samples from an input emissions sensor and an output emissions sensor.

The NOx delta chart generator 212 can be configured to generate a NOx delta chart 500 and/or other representations of the NOx delta values 312 over time. For example, as shown in FIG. 5, a NOx delta chart 500 can be a chart or graph showing the NOx delta values 312 calculated from filtered samples meeting idle operating conditions over a period of time. Accordingly, the NOx delta chart 500 can be similar to the example filtered chart 402 of FIG. 4. In other examples, the NOx delta chart generator 212 or other elements of the emissions sensor health monitor 102 can store NOx delta values 312 in the system memory 204 in association with corresponding time values, such as days associated with daily averages and/or the determined NOx delta values 312, as underlying data for a NOx delta chart 500 without generating a visual representation of the NOx delta values 312.

In some examples, the NOx delta chart generator 212 can build a new NOx delta chart 500 or update a previous NOx delta chart 500, or update underlying data, on demand or at predetermined intervals. For example, when the data filter 208 generates new average daily values including a new NOx delta value 312 based on periods of a day during which an engine 106 was in an idle condition, the NOx delta chart generator 212 can build or update a NOx delta chart 500 with the new NOx delta value 312 for that day. For example, when a new NOx delta value 312 is calculated, it can be added to the example NOx delta chart 500 of FIG. 5, or the NOx delta chart 500 shown in FIG. 5 can be re-generated to include the new NOx delta value 312. The NOx delta chart generator 212 can build or update the NOx delta chart 500 to illustrate NOx delta values 312 over a rolling window of time, a designated period of time, or for any other range of time.

In some examples, the emissions sensor health monitor 102 can have a user interface that can display one or more NOx delta charts 500, and/or receive user commands to generate or update NOx delta charts 500 for predetermined or user-specified periods of time. Although in some examples the NOx delta chart 500 can be generated or presented to a user in a visible format as shown in FIG. 5, in other examples the NOx delta chart generator 212 can maintain the underlying data of a NOx delta chart 500 in a machine-readable form that is readable by the NOx delta evaluator 214 as noted above, and can generate a visual representation of a NOx delta chart 500 from that underlying data when a NOx delta chart 500 is to be visually displayed.

The NOx delta evaluator 214 can compare NOx delta values 312 displayed in a NOx delta chart 500, and/or in data underlying a NOx delta chart 500, against the target values 210 to determine if the NOx delta values 312 have been above or below the target values 210 for at least a threshold period of time. In some examples, the threshold period of time can be four days. However, in other examples, the threshold period of time can be a longer or shorter period of time. When the NOx delta evaluator 214 determines that NOx delta values 312 in a NOx delta chart 500, or in underlying data of a NOx delta chart 500, have been above or below the target values 210 for at least the threshold period of time, the NOx delta evaluator 214 can notify the alert manager 216.

For example, as shown in the example of FIG. 5, although NOx delta values 312 may occasionally go above or below target values 210, in some cases NOx delta values 312 that are too high or too low on one day may return to being within target values 210 the next day, or within a few days. In such situations in which the NOx delta values 312 return to being within target values 210 relatively quickly, the too-high or too-low NOx delta values 312 may not have been due to a NOx sensor that is failing and may instead have been due to aberrant measurements, unusual operating conditions, or other factors. For example, for the first few months depicted in FIG. 5, the NOx delta values 312 are generally within a range of target values 210 between positive 30 ppm and minus 30 ppm. During those first few months in example of FIG. 5, the occasional NOx delta value 312 is above or below the target values 210, but do not stay above or below the target values 210 for more than a threshold period of time. However, if too-high or too-low NOx delta values 312 do not return to target values 210 within four days or another predefined threshold period of time, the NOx delta evaluator 214 can determine that at least one of the input emissions sensor 114 and the output emissions sensor 116 may be failing, and notify the alert manager 216. For example, approximately halfway through the period of time shown in the example of FIG. 5, the NOx delta values 312 trend downward such that they stay below a range of target values 210, such as a range between plus and minus 30 ppm, for more than a four-day threshold period of time. This can indicate that one or both of the input emissions sensor 114 and the output emissions sensor 116 may be failing, and the NOx delta evaluator 214 can accordingly notify the alert manager 216.

The alert manager 216 can be configured to generate and/or send sensor alerts 120 when the NOx delta evaluator 214 determines that NOx delta values 312 associated with a machine 100 have been above or below target values 210 for at least the threshold period of time. The alert manager 216 can send a sensor alert 120 to user devices 122 of one or more recipients associated with the machine 100, and accordingly inform the recipients that one or both of the input emissions sensor 114 or output emissions sensor 116 of the machine 100 may be failing. In response, a recipient may choose to inspect the machine 100 and choose to replace the input emissions sensor 114 and/or output emissions sensor 116.

In some examples, the alert manager 216 may have a database or list of designated recipients for one or more machines 100, including email addresses, phone numbers, identifiers for user devices 122 associated with those designated recipients, and/or other contact information. Accordingly, the alert manager 216 can use information in the database or list to send sensor alerts 120 to user devices 122 of one or more of the designated recipients associated with a particular machine 100 when the NOx delta evaluator 214 determines that NOx delta values 312 associated with that machine 100 have been above or below the target values 210 for at least the threshold period of time.

In some examples, a sensor alert 120 generated by the alert manager 216 can include a visual representation of the NOx delta chart 500 generated by the NOx delta chart generator 212, such that the recipient can review the NOx delta chart 500 when the recipient views the sensor alert 120 via a user device 122. The sensor alert 120 can be an email, text message, or other type of message that the alert manager 216 sends to an email address, phone number, or other address associated with a designated recipient, which the recipient can view via a user device 122. In other examples, the sensor alert 120 can be an application notification sent to an application installed on a user device 122. In still other examples, the sensor alert 120 can be displayed within a user interface of the emissions sensor health monitor 102.

Example embodiments may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, example embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

Although FIG. 1 depicts the emissions sensor health monitor 102 executing on an off-board computing system apart from the machine 100, in some examples, the emissions sensor health monitor 102 can be part of the machine 100 and operate on one or more on-board computing devices of the machine 100. In these examples, machine channel data 104 from the engine 106 and aftertreatment system 110 can be provided directly to the on-board emissions sensor health monitor 102, and upon a determination by the on-board emissions sensor health monitor 102 that an input emissions sensor 114 or an output emissions sensor 116 that is trending toward failure, the on-board emissions sensor health monitor 102 can cause an indicator light to illuminate on a dashboard of the machine 100 instead or in addition to sending a sensor alert 120, send a sensor alert 120 to user devices 122 of one or more recipients, or otherwise inform a user of the possible failure of the input emissions sensor 114 or output emissions sensor 116.

In other examples, an emissions sensor health monitor 102 executing on an off-board computing device or an on-board computing device can send a sensor alert 120 or other message to an electronic control module (ECM) of the machine 100. The sensor alert 120 or other message can include data indicating that the input emissions sensor 114 and/or the output emissions sensor 116 is trending toward failure, for example including data about trends of NOx measurements from the input emissions sensor 114 and/or the output emissions sensor 116 over time and/or indications of how far determined NOx delta values 312 are away from target values 210 or estimates of how far NOx measurements have drifted from actual measurements. For instance, based on NOx delta values 312 that indicate that measurements from the output emissions sensor 116 have drifted above measurements from the input emissions sensor 114 during idle operating conditions, the emissions sensor health monitor 102 can inform the ECM that NOx measurements from the output emissions sensor 116 may have drifted away from actual NOx concentrations to a certain degree. In these examples, the ECM of the machine 100 respond by reconfiguring elements of the aftertreatment system 110, for instance by scaling measurements from the input emissions sensor 114 or output emissions sensor 116 to counteract a determined amount measurement drift over time or by reconfiguring one or more emissions treatment devices 112 to account for inaccurate NOx measurements that have drifted away from actual NOx concentrations by a determined degree.

Figure 6:
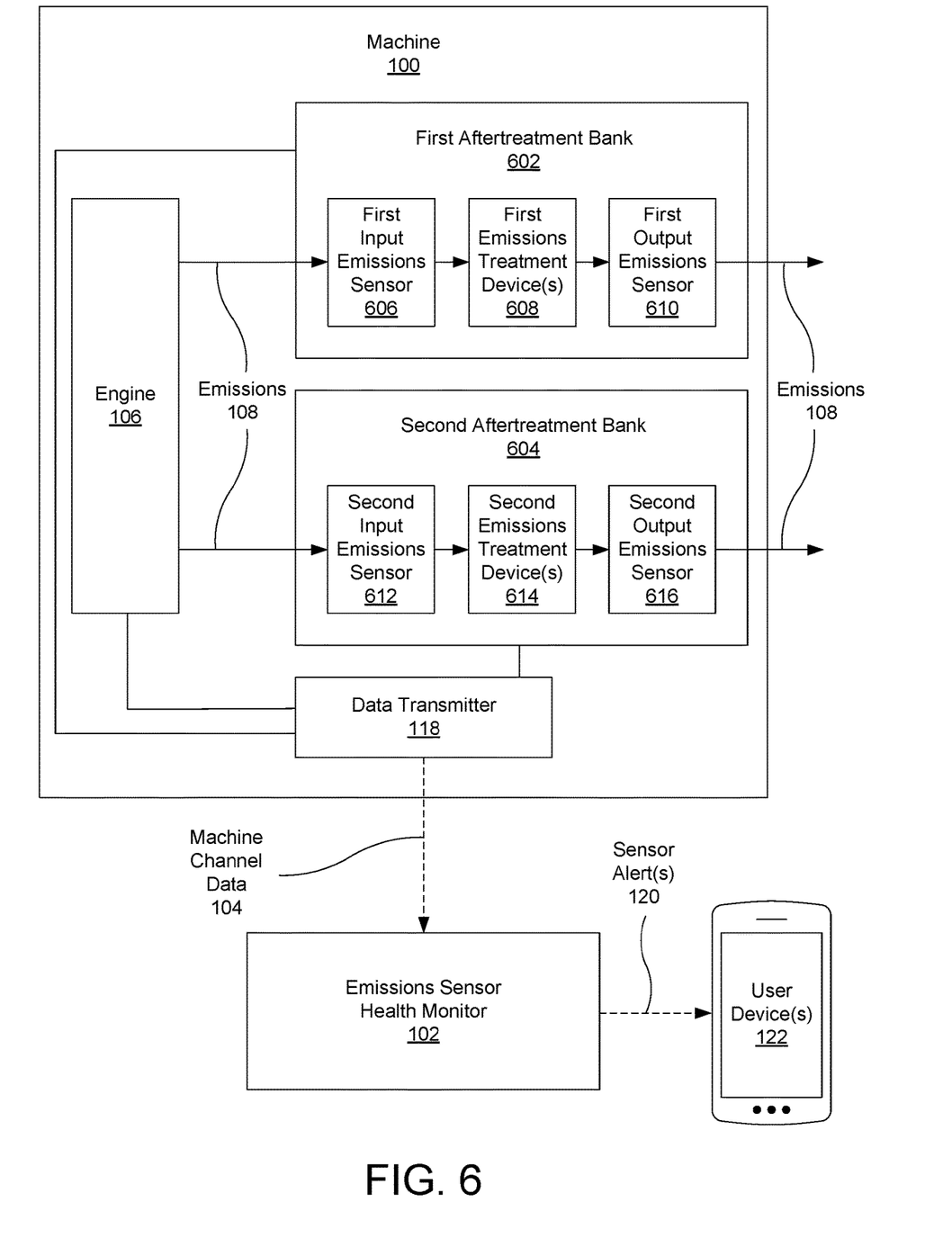
FIG. 6 depicts an example of a system including a machine with two aftertreatment banks.

FIG. 6 depicts an example of a system including a machine 100 with a first aftertreatment bank 602 and a second aftertreatment bank 604. Each of the first aftertreatment bank 602 and a second aftertreatment bank 604 can be substantially similar to the aftertreatment system 110, but process different emissions 108. For example, the first aftertreatment bank 602 can process emissions 108 associated with a left exhaust of an engine 106, while the second aftertreatment bank 604 can process emissions 108 associated with a right exhaust port of the same engine 106. The first aftertreatment bank 602 can include a first input emissions sensor 606 that is substantially similar to the input emissions sensor 114, one or more first emissions treatment devices 608 that are substantially similar to the emissions treatment devices 112, and a first output emissions sensor 610 that is substantially similar to the output emissions sensor 116. The second aftertreatment bank 604 can include a second input emissions sensor 612 that is substantially similar to the input emissions sensor 114, one or more second emissions treatment devices 614 that are substantially similar to the emissions treatment devices 112, and a second output emissions sensor 616 that is substantially similar to the output emissions sensor 116.

In examples having a first aftertreatment bank 602 and a second aftertreatment bank 604, machine channel data 104 from the engine 106 and both the first aftertreatment bank 602 and the second aftertreatment bank 604 can be transmitted to the emissions sensor health monitor 102. Accordingly, the emissions sensor health monitor 102 can use the process described above to compare NOx delta values 312 associated with the first aftertreatment bank 602 to determine if the first input emissions sensor 606 and/or the first output emissions sensor 610 may be trending towards failure. Similarly, the emissions sensor health monitor 102 can use the process described above to compare NOx delta values 312 associated with the second aftertreatment bank 604 to determine if the second input emissions sensor 612 and/or the second output emissions sensor 616 may be trending towards failure.

In addition, in the example of FIG. 6, the emissions sensor health monitor 102 can also compare first NOx delta values 312 associated with the first aftertreatment bank 602 against second NOx delta values 312 associated with the second aftertreatment bank 604 to determine whether one or more emissions sensors in one of the aftertreatment banks is trending towards failure. For example, if NOx delta values 312 associated with the first aftertreatment bank 602 are higher than target values 210 while NOx delta values 312 associated with the second aftertreatment bank 604 are within a range of target values 210, even though both sets of NOx delta values 312 are associated with the same idle operating conditions, the emissions sensor health monitor 102 can determine that at least one of the first input emissions sensor 606 and the first output emissions sensor 610 of the first aftertreatment bank 602 specifically may be trending towards failure.

Figure 7:
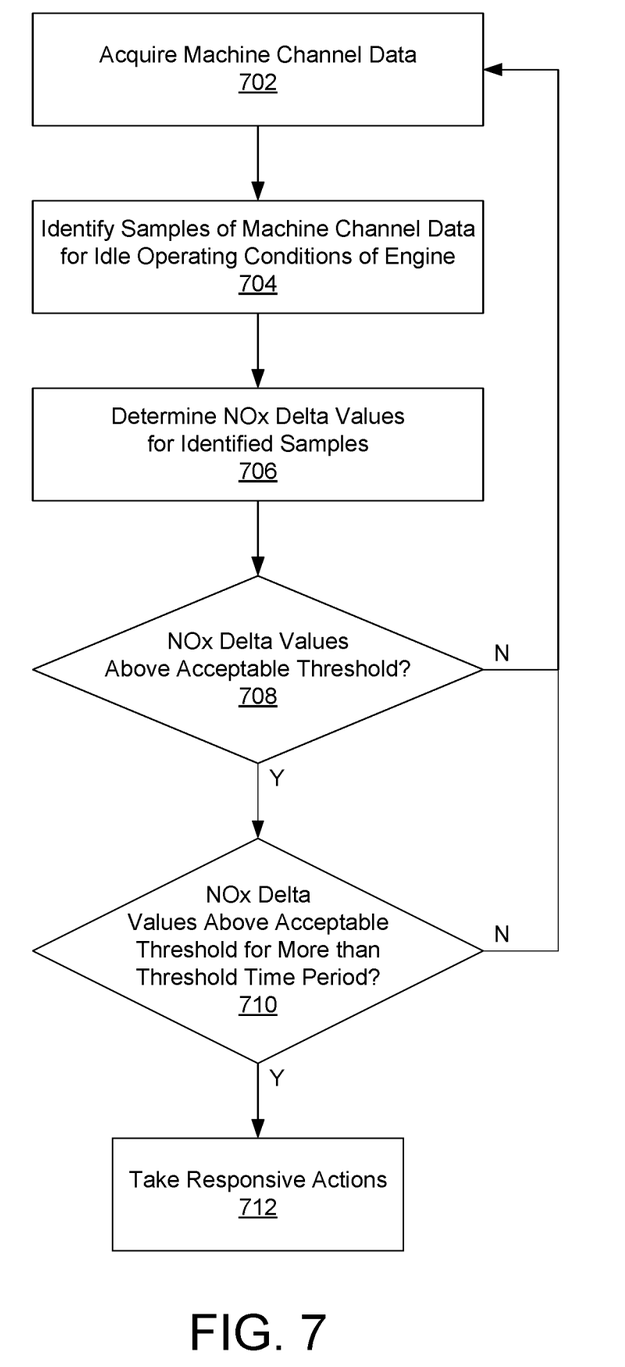
FIG. 7 depicts a flow chart of a process for detecting a failing emissions sensor.

FIG. 7 depicts a flow chart of a process for detecting a failing emissions sensor, such as an input emissions sensor 114 and/or an output emissions sensor 116. The process of FIG. 7 can be performed by an emissions sensor health monitor 102 based on machine channel data 104 received from a machine 100.

At operation 702, the emissions sensor health monitor 102 can acquire machine channel data 104 from a machine 100. In some examples, the emissions sensor health monitor 102 can receive machine channel data 104 over a network when the machine wirelessly transmits machine channel data 104 recorded by one or more sensors on the machine. In other examples, the emissions sensor health monitor 102 can obtain the machine channel data 104 from a wired connection with the machine, through a memory card data transfer, and/or via any other data transfer method. The machine channel data 104 can include engine speeds 302, fuel levels 304, emissions temperatures 306, NOx-in values 308 measured by an input emissions sensor 114, and/or NOx-out values 310 measured by an output emissions sensor 116. In various examples, the emissions sensor health monitor 102 can obtain machine channel data 104 from the machine 100 multiple times per day, once a day, once a week, on any other schedule, or on demand when requested by the emissions sensor health monitor 102 from the machine 100. In some examples, such as the example of FIG. 6, the emissions sensor health monitor 102 may acquire machine channel data 104 associated with multiple banks of aftertreatment systems 110 that have independent input emissions sensors 114, emissions treatment devices 112, and/or output emissions sensors 116.

At operation 704, the emissions sensor health monitor 102 can identify samples of the machine channel data 104 that meet criteria associated with an idle operating condition for an engine 106 of the machine 100. For example, the emissions sensor health monitor 102 can identify sets of samples within the machine channel data 104 that have engine speeds 302 below an engine speed threshold for the idle operating condition, emissions temperatures 306 below an emissions temperature threshold for the idle operating condition, and fuel levels 304 indicating a fuel level or consumption rate below a fuel rate threshold for the idle operating condition. In some examples, the emissions sensor health monitor 102 may downsample the machine channel data 104 to a lower frequency prior to identifying the samples during operation 704. For example, if the machine channel data 104 reported by the machine 100 includes multiple samples per second, the emissions sensor health monitor 102 can select one sample per second as being representative of the machine channel data 104 and thereby downsample the machine channel data 104 to 1 Hz. In some examples, during operation 704, the emissions sensor health monitor 102 may also smooth the machine channel data 104 by determining daily averages, or averages over longer or shorter time periods, of identified samples that meet the idle operating condition criteria.

At operation 706, the emissions sensor health monitor 102 can determine a NOx delta value 312 based on the difference between NOx-in values 308 and NOx-out values 310 for identified samples, or averages of such identified samples. For example, when the emissions sensor health monitor 102 downsamples machine channel data 104, identifies samples within the downsampled machine channel data 104 that meet idle operating condition criteria, and generates daily averages of the identified samples at operation 704, the emissions sensor health monitor 102 can determine a NOx delta value 312 for a day by subtracting the daily average of NOx-out values 310 from the daily average of NOx-in values 308. In examples with multiple aftertreatment banks, as shown in FIG. 6, the emissions sensor health monitor 102 can determine NOx delta values 312 for each aftertreatment bank. For example, the emissions sensor health monitor 102 can determine a first set of NOx delta values 312 based on a difference in measurements from a first input emissions sensor 606 and a first output emissions sensor 610 in a first aftertreatment bank 602, as well as a second set of NOx delta values 312 based on a difference in measurements from a second input emissions sensor 612 and a second output emissions sensor 616 in a second aftertreatment bank 604.

At operation 708, the emissions sensor health monitor 102 can determine if NOx delta values 312 determined during operation 706 are above a predefined acceptable threshold. The predefined acceptable threshold can be based on historical machine channel data 104 for other machines 100 of the same type or model as the machine 100 being analyzed by the emissions sensor health monitor 102. The predefined acceptable threshold can be based on the absolute values of NOx delta values 312 measured during idle operating conditions in the historical machine channel data 104 during periods of time when input emissions sensors 114 and output emissions sensors 116 were verified as operating normally and were not failing. For example, when target values 210 are in a range from plus 30 ppm to negative 30 ppm, the emissions sensor health monitor can determine if the absolute value of NOx delta values 312 determined during operation 706 exceed 30 ppm. If the emissions sensor health monitor 102 determines that that NOx delta values 312 determined during operation 706 are below the predefined acceptable threshold, the emissions sensor health monitor 102 can wait to acquire subsequent machine channel data 104 at operation 702. If the NOx delta values 312 determined during operation 706 are above the predefined acceptable threshold, the emissions sensor health monitor 102 can move to operation 710.

In some examples, the emissions sensor health monitor 102 can determine if NOx delta values 312 determined during operation 706 are above a predefined acceptable threshold with respect to a single aftertreatment bank as shown in FIG. 1. However, in other examples the emissions sensor health monitor 102 can alternately, or in addition, determine a difference between different sets of NOx delta values 312 associated with different aftertreatment banks as shown in FIG. 6, and determine at operation 706 whether the difference in NOx delta values 312 associated with different aftertreatment banks exceeds a predefined acceptable threshold.

At operation 710, the emissions sensor health monitor 102 can determine whether the NOx delta values 312 have been above the predefined acceptable threshold for at least a predefined threshold time period. For example, the predefined threshold time period can be four days, or a shorter or longer period of time. If the NOx delta values 312 have not been above the predefined acceptable threshold for at least the predefined threshold time period, the emissions sensor health monitor 102 can wait to acquire subsequent machine channel data 104 at operation 702. However, if the emissions sensor health monitor 102 determines that the NOx delta values 312 have been above the predefined acceptable threshold for at least the predefined threshold time period, the emissions sensor health monitor 102 can move to operation 712. In some examples, the emissions sensor health monitor 102 may also, or alternately, move to operation 712 upon determining that a difference between sets of NOx delta values 312 associated with different aftertreatment banks exceeds a predefined acceptable threshold for at least the predefined threshold time period.

At operation 712, the emissions sensor health monitor 102 can take one or more responsive actions in response to determining that the NOx delta values 312, or a difference between sets of NOx delta values 312, have been above the predefined acceptable threshold for at least the predefined threshold time period. In some examples, the emissions sensor health monitor 102 can generate and/or send a sensor alert 120 as a responsive action at operation 712. The sensor alert 120 can be an indication that one or both of the input emissions sensor 114 and the output emissions sensor 116 may be failing, and may, in some examples, include a NOx delta chart 500 generated by the emissions sensor health monitor 102. If the emissions sensor health monitor 102 determined that a difference in sets of NOx delta values 312 associated with different aftertreatment banks indicated a potential failure associated with one of the aftertreatment banks, the sensor alert 120 may identify which of the aftertreatment banks may have the potential failure.

In some examples, the emissions sensor health monitor 102 can generate the sensor alert 120 as an email, text message, notification, or other message, and the emissions sensor health monitor 102 can send the generated sensor alert 120 to user devices 122 of one or more designated recipients associated with the machine 100. In other examples, the emissions sensor health monitor 102 can generate the sensor alert 120 as a notification or message displayed in a user interface of the emissions sensor health monitor 102 or in an application executing on a user device 122, display the sensor alert 120 as a dashboard light or other indicator on-board the machine 100, and/or generate and display the sensor alert 120 in any other desired presentation.

In other examples, at operation 712 the emissions sensor health monitor 102 can alternately, or additionally, take one or more other responsive actions, such as sending an alert to an ECM of the machine 100 indicating that the input emissions sensor 114 and/or the output emissions sensor 116 that may be failing. In these examples, the ECM may be able to reconfigure elements of the aftertreatment system 110 to compensate for drifting measurements from the input emissions sensor 114 and/or the output emissions sensor 116, for instance by scaling measurements from those sensors to counteract the detected measurement drift or by reconfiguring emissions treatment devices 112 to compensate for NOx measurements that may be inaccurate by a degree determined by the emissions sensor health monitor 102.

INDUSTRIAL APPLICABILITY

The systems and methods described herein can detect when at least one of an input emissions sensor 114 and an output emissions sensor 116 in a machine 100 may be failing. Emissions sensors, such as NOx sensors, can gradually fail or go faulty over time. For example, a NOX sensor that is operating normally can provide substantially accurate measurements of NOx concentrations in emissions 108. However, as the NOx sensor begins to fail, the measurements it reports can drift farther and farther away from the actual concentration of NOx in emissions 108. Such drifting and/or inaccurate measurements can cause problems with an aftertreatment system 110 of a machine, or the machine 100 overall.

For example, an aftertreatment system 110 may rely on NOx measurements from an input emissions sensor 114 to determine how to treat emissions 108. While an aftertreatment system 110 may be able to tolerate inaccurate NOx measurements to a degree, the aftertreatment system 110 may be unable to properly treat emissions 108 when NOx measurements drift beyond that degree. As an example, an SCR system in an aftertreatment system 110 may determine how much reductant to inject into an exhaust path based on NOx measurements provided by an input emissions sensor 114. If the NOx sensor is failing and the measurements it provides have significantly drifted away from actual NOx concentrations in emissions 108, the inaccurate measurements from the failing NOx sensor may cause the SCR system may inject too much, or not enough, reductant into the exhaust path.

As another example, measurements from an output emissions sensor 116 may be used by an operator to determine whether a machine 100 is meeting applicable emissions standards. If NOx concentrations in emissions 108 emitted by the machine 100 would fail emissions standards, but NOx measurements from an output emissions sensor 116 have drifted away from the actual NOx concentrations such that an operator of the machine 100 would believe that the machine 100 is complying with the emissions standards, the inaccurate measurements from the output emissions sensor 116 can cause increased amounts of pollutants to be emitted into the atmosphere.

In some cases, if inaccurate measurements from the input emissions sensor 114 and/or output emissions sensor 116 are eventually detected, fines or other penalties may be levied for non-compliance with emissions standards and/or significant machine downtime may occur while the aftertreatment system 110, input emissions sensor 114, output emissions sensor 116, and/or other components of the machine 100 are tested, repaired, and/or replaced. However, the systems and methods described herein can be used to detect when input emissions sensor 114 and/or output emissions sensor 116 are trending towards failure even if measurements from those emissions sensors would not yet lead to machine downtime, non-compliance with emissions standards, or other problems. Accordingly, when failing emissions sensors can be detected as described herein, underlying problems can be proactively investigated, fixed, and/or addressed before more significant issues arise.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof

What is claimed is:

1. A method comprising:
acquiring, by an emissions sensor health monitor executing on a computing device,
machine channel data from a machine, the machine channel data indicating:
nitrogen oxide (NOx)-in values measured by an input emissions sensor of the machine, and
NOx-out values measured by an output emissions sensor of the machine; identifying, by the emissions sensor health monitor, a plurality of samples of the machine channel data that meet criteria associated with an idle operating condition of an engine of the machine;
determining, by the emissions sensor health monitor, NOx delta values for the plurality of samples;
determining, by the emissions sensor health monitor, that the NOx delta values are above a preset acceptable threshold for at least a threshold time period; and
performing, by the emissions sensor health monitor, one or more responsive actions based on the determining that the NOx delta values are above the preset acceptable threshold for at least the threshold time period.

2. The method of claim 1, wherein at least one of the one or more responsive actions includes transmitting a sensor alert to user devices of one or more designated recipients associated with the machine, the sensor alert indicating that at least one of the input emissions sensor and the output emissions sensor is failing.

3. The method of claim 1, wherein at least one of the one or more responsive actions includes sending a message to an electronic control module of the machine indicating that at least one of the input emissions sensor and the output emissions sensor is failing.

4. The method of claim 1, wherein the machine channel data further includes at least one of engine speed data, fuel level data, and emissions temperature data.

5. The method of claim 4, wherein the criteria associated with the idle operating condition of the engine includes at least one of an engine speed threshold, a fuel rate threshold, and an emissions temperature threshold.

6. The method of claim 1, further comprising:
   determining, by the emissions sensor health monitor, a second set of NOx delta values based on a difference between second NOx-in values measured by a second input emissions sensor of the machine and second NOx-out values measured by a second output emissions sensor of the machine; and
   determining, by the emissions sensor health monitor, that a difference between the NOx delta values and the second set of NOx delta values are above the preset acceptable threshold for at least the threshold time period.

7. The method of claim 1, further comprising storing, by the emissions sensor health monitor, the NOx delta values in association with corresponding time values.

8. The method of claim 7, further comprising presenting a visual representation of the NOx delta values in association with the corresponding time values in a user interface or electronic message associated with the emissions sensor health monitor.

9. The method of claim 1, wherein the preset acceptable threshold is based on historical NOx delta values, the historical NOx delta values comprising machine channel data from one or more additional machines, the historical NOx delta values also being associated with periods of time when NOx sensors of the one or more additional machines are verified as providing substantially accurate measurements.

10. A computing device comprising:
    one or more processors; and
    memory storing computer-executable instructions that, when executed by the one or more processors, cause the one or more processors to perform operations comprising:
        acquiring machine channel data from a machine, the machine channel data indicating:
            nitrogen oxide (NOx)-in values measured by an input emissions sensor of the machine, and
            NOx-out values measured by an output emissions sensor of the machine;
        identifying a plurality of samples of the machine channel data that meet criteria associated with an idle operating condition of an engine of the machine;
        determining NOx delta values for the plurality of samples;
        determining that the NOx delta values are above a preset acceptable threshold for at least a threshold time period; and
        performing one or more responsive actions based on the determining that the NOx delta values are above the preset acceptable threshold for at least the threshold time period.

11. The computing device of claim 10, wherein at least one of the one or more responsive actions includes transmitting a sensor alert to user devices of one or more designated recipients associated with the machine, the sensor alert indicating that at least one of the input emissions sensor and the output emissions sensor is failing.

12. The computing device of claim 10, wherein at least one of the one or more responsive actions includes sending a message to an electronic control module of the machine indicating that at least one of the input emissions sensor and the output emissions sensor is failing.

13. The computing device of claim 10, wherein the machine channel data further includes at least one of engine speed data, fuel level data, and emissions temperature data, and wherein the criteria associated with the idle operating condition of the engine includes at least one of an engine speed threshold, a fuel rate threshold, and an emissions temperature threshold.

14. The computing device of claim 10, wherein the operations further comprise presenting a visual representation of the NOx delta values in association with corresponding time values in a user interface or electronic message.

15. The computing device of claim 10, wherein the preset acceptable threshold is based on historical NOx delta values, the historical NOx delta values comprising machine channel data from one or more additional machines, the historical NOx delta values also being associated with periods of time when NOx sensors of the one or more additional machines are verified as providing substantially accurate measurements.

16. One or more non-transitory computer-readable media storing computer-executable instructions that, when executed by one or more processors of a computing device, cause the computing device to perform operations comprising:
    acquiring machine channel data from a machine, the machine channel data indicating:
    nitrogen oxide (NOx)-in values measured by an input emissions sensor of the machine, and
    NOx-out values measured by an output emissions sensor of the machine; identifying a plurality of samples of the machine channel data that meet criteria associated with an idle operating condition of an engine of the machine;
    determining NOx delta values for the plurality of samples;
    determining that the NOx delta values are above a preset acceptable threshold for at least a threshold time period; and
    performing one or more responsive actions based on the determining that that the NOx delta values are above the preset acceptable threshold for at least the threshold time period.

17. The one or more non-transitory computer-readable media of claim 16, wherein at least one of the one or more responsive actions includes transmitting a sensor alert to user devices of one or more designated recipients associated with the machine, the sensor alert indicating that at least one of the input emissions sensor and the output emissions sensor is failing.

18. The one or more non-transitory computer-readable media of claim 16, wherein at least one of the one or more responsive actions includes sending a message to an electronic control module of the machine indicating that at least one of the input emissions sensor and the output emissions sensor is failing.

19. The one or more non-transitory computer-readable media of claim 16, wherein the machine channel data further includes at least one of engine speed data, fuel level data, and emissions temperature data, and wherein the criteria associated with the idle operating condition of the engine includes at least one of an engine speed threshold, a fuel rate threshold, and an emissions temperature threshold.

20. The one or more non-transitory computer-readable media of claim 16, wherein the preset acceptable threshold is based on historical NOx delta values, the historical NOx delta values comprising machine channel data from one or more additional machines, the historical NOx delta values also being associated with periods of time when NOx sensors of the one or more additional machines are verified as providing substantially accurate measurements.

* * * * *